(12) United States Patent
Bostick et al.

(10) Patent No.: US 8,176,314 B2
(45) Date of Patent: May 8, 2012

(54) SYSTEM STARTUP WITH APPLICATIONS USING CONFIGURABLE OPTIONS

(75) Inventors: James Edward Bostick, Cedar Park, TX (US); Randolph Michael Forlenza, Austin, TX (US); John Paul Kaemmerer, Pflugerville, TX (US); Raghuraman Kalyanaraman, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1110 days.

(21) Appl. No.: 12/035,971

(22) Filed: Feb. 22, 2008

(65) Prior Publication Data
US 2009/0217308 A1 Aug. 27, 2009

(51) Int. Cl.
*G06F 9/00* (2006.01)
(52) U.S. Cl. .................... 713/100; 713/1; 713/2
(58) Field of Classification Search .......... 713/2, 100, 713/1
See application file for complete search history.

(56) References Cited

U.S. PATENT DOCUMENTS

| | | | |
|---|---|---|---|
| 7,702,891 B1* | 4/2010 | Nazarov et al. | 713/1 |
| 2004/0260956 A1* | 12/2004 | Pagan | 713/300 |
| 2005/0204198 A1* | 9/2005 | Pagan | 714/36 |
| 2005/0268299 A1* | 12/2005 | Picinich et al. | 718/100 |
| 2006/0236085 A1* | 10/2006 | Norton | 713/2 |
| 2006/0277402 A1* | 12/2006 | Wakabayashi | 713/1 |
| 2007/0016324 A1* | 1/2007 | Oddiraju et al. | 700/174 |
| 2007/0121665 A1* | 5/2007 | Ergan et al. | 370/455 |

OTHER PUBLICATIONS

Gaff, T., "Software Revies MetaProducts: Startup Organizer 2.6" (Jun. 26, 2005) [retrieved fromhttp://www.abxzone.com/abx_reviews/jorrell/article_p1.html on Jul. 8, 2011].*

MetaProducts, "Startup Organizer Development History" [retrieved from http://www.metaproducts.com/mp/Startup_Organizer-History.htm on Jul. 8, 2011].*

* cited by examiner

*Primary Examiner* — H. S. Sough
*Assistant Examiner* — Brian Wathen
(74) *Attorney, Agent, or Firm* — Yee & Associates, P.C.; Mark C. Vallone

(57) ABSTRACT

Illustrative embodiments provide a computer implemented method, a data processing system, and a computer program product for system startup with applications using configurable options. In one illustrative embodiment, the computer implemented method comprises obtaining a set of application entries and determining whether a set of property entries exist for the set of application entries. Having identified entries of the set of application entries to form a set of identified applications and responsive to determining the set of property entries exist, applying respective entries of the set of property entries to the set of identified applications, and conditionally starting the set of identified applications.

20 Claims, 4 Drawing Sheets

SYSTEM STARTUP WITH APPLICATIONS USING CONFIGURABLE OPTIONS

BACKGROUND OF THE INVENTION

1. Field of the Invention

The present invention relates generally to an improved data processing system, and in particular to a computer implemented method, an apparatus and a computer program product for system startup with applications using configurable options.

2. Description of the Related Art

In a typical operating system, a control file contains references to applications, middleware, and objects to be started as a part of the system starting process. For example, after performing a boot or restart of a system, a set of frequently used applications, middleware and objects may be started automatically for the convenience of the user. The referenced applications, middleware and objects are typically those used on a regular basis and may be those desired by a specific user or required by a business unit.

Applications, for example, may comprise a set of data, services, and interfaces supporting a particular business function. Middleware, in another example, may comprise system layered services, such as database services, networking, and administrative tools, supporting the higher level applications. Objects, in yet another example, may be more granular than either applications or middleware. Objects may be very task specific such as a device driver. Collectively these three categories may all be viewed, from a user perspective, as applications. Herein after the term "application" will be used when referring to application, middleware, or object and combinations thereof.

The applications selected for startup may typically be placed in a single location, such as a folder, that is obtained and referenced by the operating system as part of the startup process. For example, in a Microsoft® Windows®, registered trademarks of Microsoft Corporation, operating system environment, a file folder known as the "startup" folder contains applications to be executed, also referred to as executables, whenever the system is started. Other operating systems typically have a similar controlling mechanism. The name and location of the startup folder is known to the operating system start processes allowing the system to obtain the folder and contents. Obtain may imply receiving prior to reading. Typical startup locates and accesses the folder, as obtaining the folder or file, and then reads the content therein for processing. For example, an operating system convention may require a startup file having a specific name or type to also be located among other system files. In another example, the name and location may vary but a qualified name having a file name and path must be specified to allow the file to be located.

However, depending on the environment, the various executables in the startup folder may have a defined dependency such that some of the executables cannot load, or initialize, correctly until another executable has completed a load and initialization sequence. For example, the initialization of a network dialer to establish a communications link should occur before use of communication based applications. In addition, the contents of the startup folder may be sufficient for one particular environment, but not for another environment. For example, the environment required when an administrator is performing maintenance requiring access to devices and utilities may differ significantly when compared to an environment for a casual user reading an online manual. A user may also want to load and execute particular applications or middleware if circumstances match a current environment.

SUMMARY OF THE INVENTION

Illustrative embodiments provide a computer implemented method, an apparatus in the form of a data processing system, and a computer program product for system startup with applications using configurable options. In one illustrative embodiment, the computer implemented method comprises obtaining a set of application entries and determining whether a set of property entries exist for the set of application entries. Entries in the set of application entries are identified to form a set of identified applications. In response to determining that the set of property entries exist, respective entries of the set of property entries are applied to the set of identified applications. Thereafter the set of identified applications are started.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
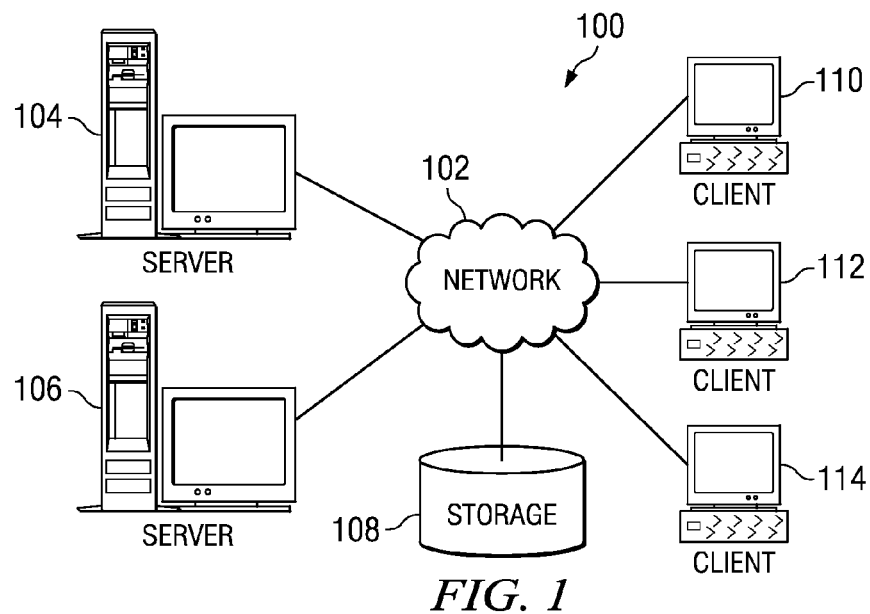
FIG. 1 is a pictorial representation of a network of data processing systems in which illustrative embodiments may be implemented.
Figure 2:
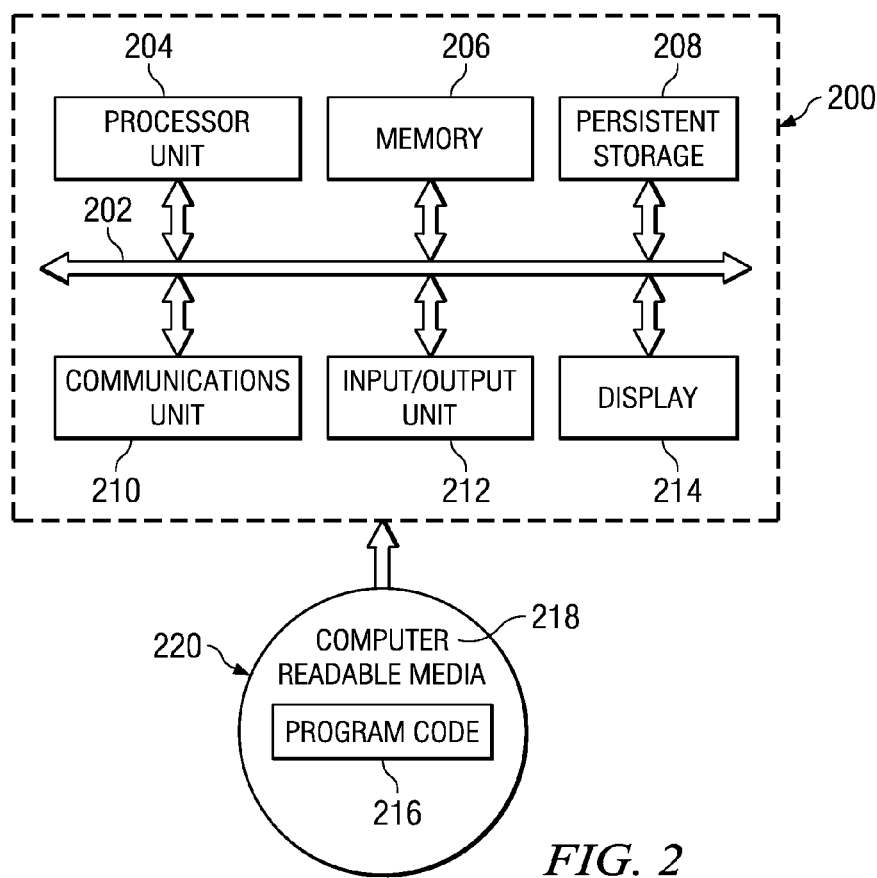
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, for example, an intranet, a local area network (LAN), or a wide area network (WAN). FIG. 1 is intended as an example, and not as an architectural limitation for the different illustrative embodiments.

Illustrative embodiments enable a user, such as a user on client 110 of FIG. 1, to configure conditional loading of executables in a startup folder located on client 110 to be used when starting client 110. Each client, such as clients 110-114, may then have a specific startup folder as required. Startup folders may also be obtained from a server such as server 106, distributed over network 102, prior to use if centralized support and control is required. Locating and obtaining a startup folder is an integral part of normal system starting activity. A user does not have to send or receive a startup folder. The system start process obtains the folder and uses the content.

In accordance with illustrative embodiments, users are able to configure a startup folder comprising executables, wherein the executables will or will not load depending upon whether user specified conditions are met. For example, a set of options may be offered. These option may comprise (1) load a specified executable when any Internet protocol (IP) address is available, (2) load an (IP) address having an Internet Protocol version 4 pattern of "xx.yy.zz.ww" or an Internet Protocol version 6 pattern "aa:bb:cc:dd:ee:ff:gg:hh" is available, (3) load a specified executable when a specific Internet protocol (IP) address is available, start an application or object only if the object is selected, (4) start objects in a specified sequence, (5) do not start an object but leave the object in the folder, (6) start an object if a prior start was successful, (7) start an object if a prior start was unsuccessful, and (8) start an object after a delay of a specified duration measured in seconds, minutes, hours or a combination.

In addition, in accordance with illustrative embodiments, a user may choose to have messages presented during the processing of the folder in conjunction with or in place of logging processing results of each command. Further, a user may use multiple commands for each executable in the specified startup folder. For example, when client 110 is started, a startup file is processed in which a communications link is established through network 102 with server 106 and storage 108 before a database query application is started using server 106 to query the information contained on storage 108.

In accordance with illustrative embodiments, conditional processing of a startup file has been provided. Conditional processing means executables, in the form of applications will or will not load, depending upon user specified conditions. Conditional processing provides more effective control of application startup in conjunction with a system startup.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, typically a bus, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions, containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as that found in an interface and memory controller hub that may be present in communications fabric 202.

Figure 3:
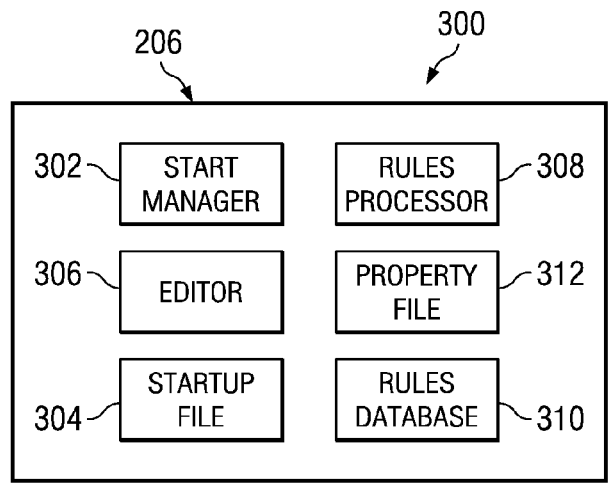
FIG. 3 is a block diagram of a portion of data processing system shown in FIG. 2 in accordance with illustrative embodiments.

With reference to FIG. 3, a block diagram of a portion of data processing system 200 of FIG. 2 showing components in accordance with illustrative embodiments is shown. Memory 206 of system 200 of FIG. 2 is shown comprising a portion of components as may be used in startup process 300 in accordance with illustrative embodiments. The components shown in this figure are start manager 302, startup file 304, editor 306, rules processor 308, rules database 310, and property file 312.

Start manager 302 is an application for managing and controlling the process of starting applications after a system has been started. Start manager 302 receives input from startup file 304 in the form of a set of applications that need to be started. A set of applications comprises zero, one, or more applications.

Editor 306 creates and maintains rules database 310, as well as property file 312 and startup file 304, in response to user input. Editor 306 may be a typical text editor, as is known in the art. Startup file 304 typically comprises a series of statements indicating the names of the applications to be processed during system startup. Startup file 304 may also be empty.

Rules processor 308 executes specified rules associated with an application named in startup file 304. The rules to be processed are maintained in rules database 310. The rules may be kept in a tabular form for easy use and maintenance or other form desired providing programmatic access for rule processor 308. Rules processor 308 may be a script executor or interpreter or other form of processor associated with the rule language.

Rules are defined in a general form of condition portion and an associated action portion. For example, a rule may state the condition as "when application x starts," and the associated action portion as "do action." The rule may be simple or complex in nature depending upon the logic specified to achieve a desired result. The condition may also be an event, such as the start or failure of an application. The action may be a simple activation of an application or object, or logic to be applied in the processing of the object. For example, "on success of network connection application, retrieve IP address; insert IP address in dial application, start dial application."

A rule from rules database 310 may be applied to more than one object or application in startup file 304. An object may also have more than one rule applied to achieve the desired conditional processing. Rules may be pre-defined for a set of users or applications or created by an end user or an application or system administrator user. Rules may be created and updated using editor 306 by an authorized user having access to rules database 310.

Property file 312 may be used to contain additional information used during the startup of an application. For example, an application entry in a startup file may refer to an entry in property file 312. The entry in property file 312 may contain start parameters or rule specification for the specific application being started. An entry may be used to specify a log session is to be activated during startup of the specified application, or a list of parameter value settings needed during the initialization of the application. Property file 312 provides a convenient location to maintain data needed by startup process 300.

Figure 4:
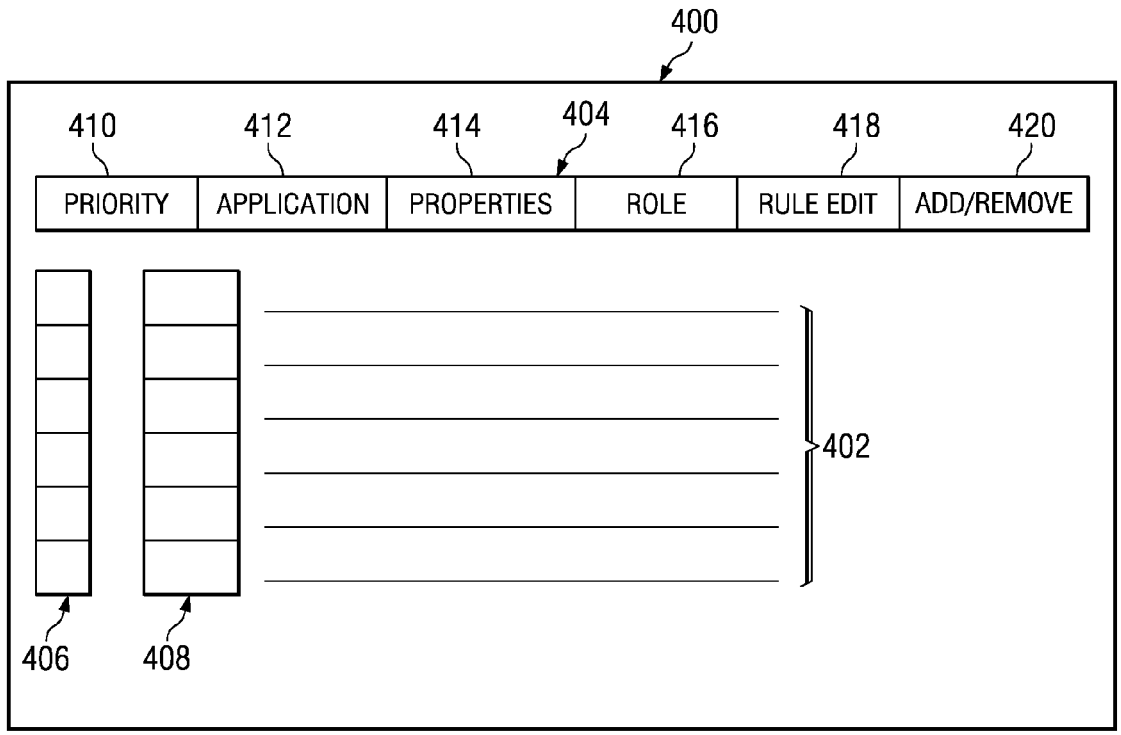
FIG. 4 is a block diagram of a user interface in accordance with illustrative embodiments.

With reference to FIG. 4, a block diagram of a user interface in accordance with illustrative embodiments is shown. User interface 400 represents a portion of a user interface as may be used in accordance with illustrative embodiments. Element 402 represents, in a list format, a set of applications that are candidates for starting as part of the initial system startup procedure. A set of applications is comprised of one or more applications. A set of tabs, or controls, may be seen in a task bar format of row 404. Entries in row 404 provide a link to a further operation or action related to the management of the set of applications to be managed. Check boxes 406 are used to toggle between enabling and disabling a listed application. Use of a check box allows a listed application to remain listed, but not processed, if desired. Priority boxes 408 indicate a current sequence within which a list of applications is to be started, however the sequence may be changed.

For example, tabs or controls may be provided to allow access to specific operations or tasks, such as priority 410, which changes the priority sequence of application startup; application 412, to select and manage a specific application; properties 414, to examine current properties of a selected application or applications; role 416, to bring specific application information into view based on the role of the user, such as an administrator or general user; rule edit 418, to edit rules specific to a selected application or all rules; add/remove 420, to add or remove applications listed for startup processing.

Figure 5:
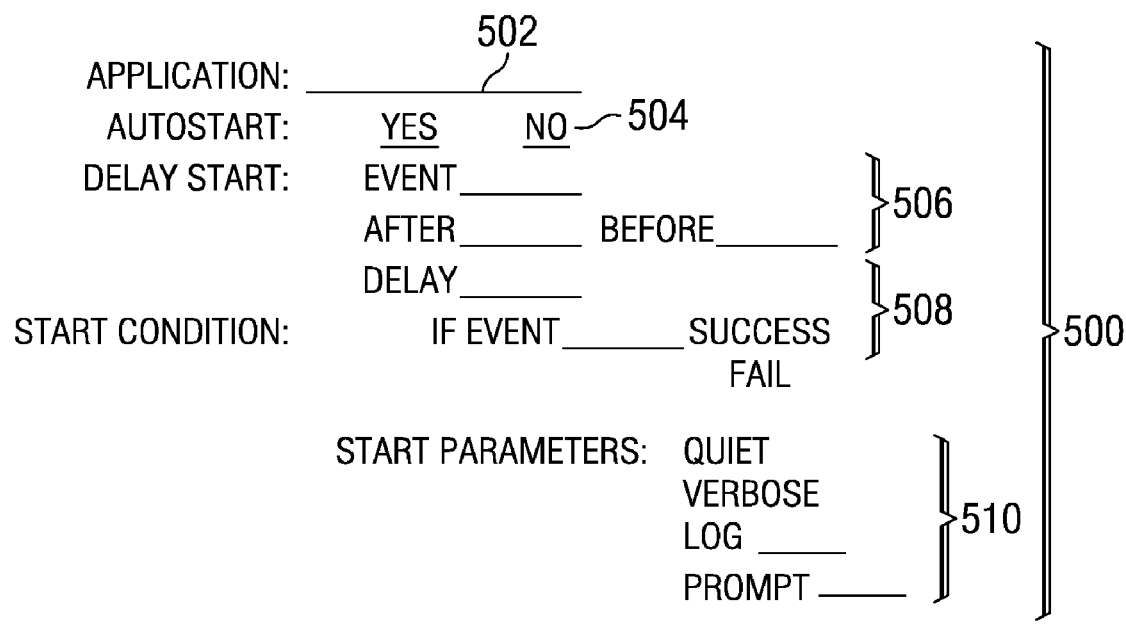
FIG. 5 is a text representation of a portion of a property file of FIG. 3, in accordance with illustrative embodiments.

With reference to FIG. 5, a text representation of a portion of a property file of FIG. 3, in accordance with illustrative embodiments is shown. By way of example, a portion of property file 312 of FIG. 3 is shown representing entries 500 related to an application in a startup file. Entries 500 provide additional information specific to an application for use at startup. The example shown is indicative of the type of information to be used in the startup process and is not meant to be an exhaustive list.

Application entry 502 provides the name of the application for which the further property values apply. Autostart entry 504 provides a choice of yes or no to enable use of automatic starting of the named application. Delay start entry 506 includes a number of parameter settings to delay the start of a named application. Within delay start entry 506 is contained a reference to an "event." The reference provides a name of a specific event on which to base a delay. The delay is a time period selection relative to the occurrence of the event. Selections include "after," "before", and a "duration" specifying the amount of delay in time units. For example, selecting "after" cause the action to occur after the specified event, while selecting "duration" specifies a time to wait before performing an action after the event.

In a similar manner, start condition entry 508 provides a set of parameters including an event name upon which the condition is based and enabling startup based on a choice of event success or fail outcomes. In these examples, an event can be a rule, as well as other identifiable activity, such as the processing of an application startup or a system event, such as a network being enabled. Further processing control is provided by selection of parameters associated with start parameters entry 510. A choice is provided for message returns in either quiet, no messages, or verbose, in which all messages are made available to the requesting user. A log entry is provided to indicate logging is to be used and the name of the log. A prompt parameter is provided to indicate prompting for additional input during the startup is required and an indication of which object is to receive a prompt, such as a specific identifier or userid.

Figure 6:
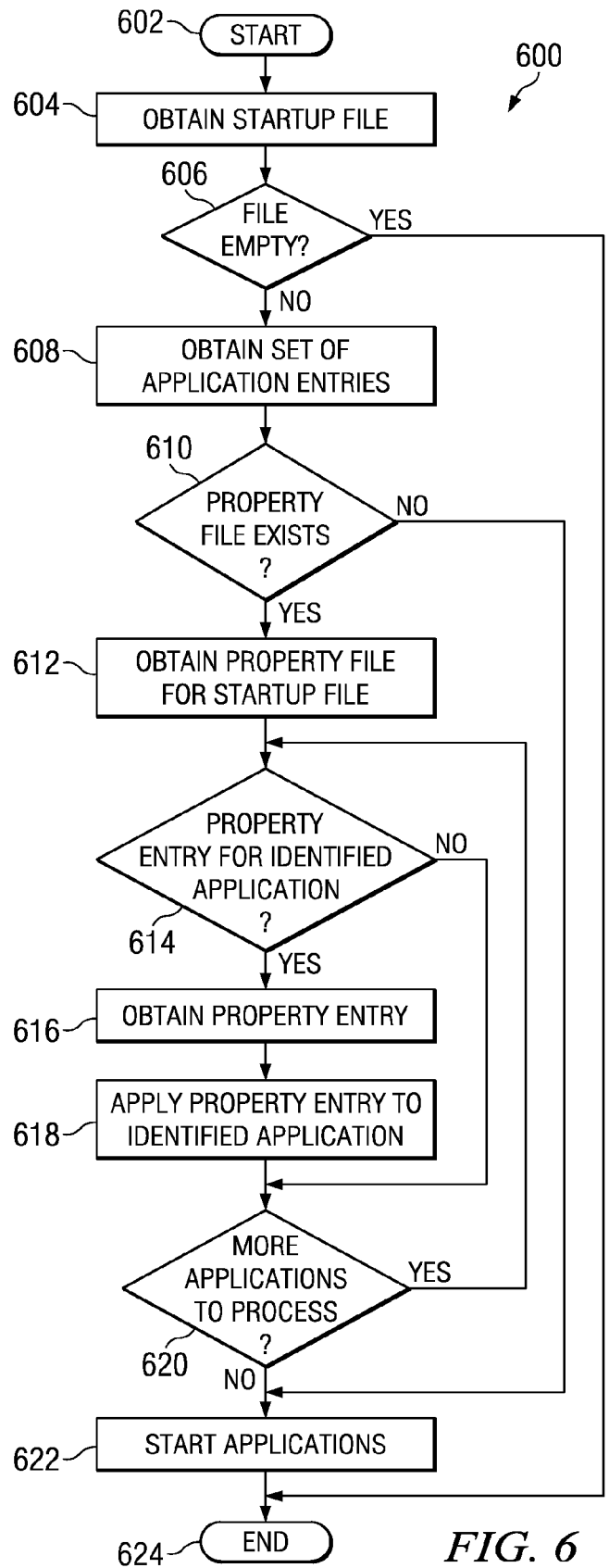
FIG. 6 is a flowchart of a startup process in accordance with illustrative embodiments.

With reference to FIG. 6, a flowchart of an example startup process 600 in accordance with illustrative embodiments is shown. Startup process 600 begins at start (step 602) and obtains a startup file to be processed (step 604). The process examines the startup file to determine whether the file contains entries for processing or if empty (step 606). If the file is empty, a "yes" results and startup process 600 terminates (step 624). If the file is not empty, a "no" is obtained and the process obtains a set of application entries to be processed (step 608). A set of application entries comprises one or more entries.

Having obtained a set of application entries in step 608, a determination is made whether a property file associated with the startup file exists (step 610). If there is no property file, a "no" results and the process begins startup of the applications (step 622). If a property file exists, a "yes" is returned and the property file for the startup file is obtained for processing (step 612).

A determination is made as to whether there is a property entry for an identified application (step 614). If there is no property entry for an identified application, a "no" results. Otherwise there are property entries and a "yes" results. A set of identified applications is then created in which a set may include one or more application entries. If step 614 returns "no," then the process determines if more applications are present to process (step 620). If more applications are present, a "yes" results and a determination is made as to whether a property entry for an identified application exists as before (step 614). If more applications are not present to process, a "no" results and the process starts the applications (step 622).

If property entries exist, a "yes" results in step 614, then property entries are obtained (step 616). For each application, the process applies the property entry to the identified application (step 618). Startup process 600 returns to determine whether more applications are present to process (step 620). In an alternative implementation, after applying the property entries to an identified application, the application may be started, as in step 622, rather than waiting to process all applications as currently indicated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for system startup with applications using configurable options, the method comprising:
    a computer obtaining a set of application entries;
    the computer determining whether a set of property entries exist for the set of application entries;
    the computer identifying entries of the set of application entries to form a set of identified applications;
    responsive to determining the set of property entries exist, the computer applying respective entries of the set of property entries to the set of identified applications; and
    for each identified application of the identified applications:
        responsive to the computer determining that a delayed start entry is applied to the identified application, the computer starting the identified application after an amount of time elapsed after occurrence of an event, wherein the amount of time and the event are specified by the delayed start entry.

2. The method of claim 1, wherein the obtaining the set of application entries comprises obtaining a startup file.

3. The method of claim 1, wherein the determining whether the set of property entries exist for the set of application entries comprises:
    obtaining a property file associated with the set of application entries; and
    determining whether property entries exist for the set of identified applications.

4. The method of claim 1 wherein the applying respective entries of the set of property entries to the set of identified applications further comprises:
    determining whether more applications exist for processing;
    identifying another application to form another identified application; and
    determining whether a property entry exists for the another identified application.

5. The method of claim 1 wherein the event comprises the computer processing a startup of a specified application.

6. A computer system for system startup with applications using configurable options, the computer system comprising:
    a processor, a computer-readable memory and a computer-readable tangible storage device:
    program instructions, stored on the storage device for execution by the processor via the memory, to obtain a set of application entries;
    program instructions, stored on the storage device for execution by the processor via the memory, to determine whether a set of property entries exist for the set of application entries;
    program instructions, stored on the storage device for execution by the processor via the memory, to identify entries of the set of application entries to form a set of identified applications;
    program instructions, stored on the storage device for execution by the processor via the memory, to apply respective entries of the set of property entries to the set of identified applications in response to determining that the set of property entries exist; and
    program instructions, stored on the storage device for execution by the processor via the memory, to, for each identified application of the identified applications, start the identified application after an amount of time elapsed after occurrence of an event in response to determining that a delayed start entry is applied to the identified application, wherein the amount of time and the event are specified by the delayed start entry.

7. The computer system of claim 6 wherein:
    the program instructions to obtain the set of application entries obtain a startup file.

8. The computer system of claim 6 further comprising:
    program instructions, stored on the storage device for execution by the processor via the memory, to conditionally start each application in the set of application entries in response to determining that the set of property entries do not exist.

9. The computer system of claim 6 wherein:
    the program instructions to determine whether the set of property entries exist for the set of application entries obtain a property file associated with the set of application entries and determine whether property entries exist for the set of identified applications.

10. The computer system of claim 6 wherein the program instructions to apply respective entries of the set of property entries to the set of identified applications:
    determine whether more applications exist for processing;
    identify another application to form another identified application; and
    determine whether a property entry exists for the another identified application.

11. The computer system of claim 6 wherein the event comprises processing a startup of a specified application.

12. A computer program product for system startup with applications using configurable options, the computer program product comprising:
   a computer-readable tangible storage device;
   program instructions, stored on the storage device, to obtain a set of application entries;
   program instructions, stored on the storage device, to determine whether a set of property entries exist for the set of application entries;
   program instructions, stored on the storage device, to identify entries of the set of application entries to form a set of identified applications;
   program instructions, stored on the storage device, to, in response to determining that the set of property entries exist, apply respective entries of the set of property entries to the set of identified applications; and
   instructions, stored on the storage device, to, for each identified application of the of identified applications, start the identified application after an amount of time elapsed after occurrence of an event responsive to determining that a delayed start entry is applied to the identified application, wherein the amount of time and the event are specified by the delayed start entry.

13. The computer program product of claim 12, wherein the program instructions to obtain the set of application entries obtain a startup file.

14. The computer program product of claim 12, further comprising program instructions, stored on the storage device, to, in response to determining that the set of property entries do not exist, conditionally starts each application in the set of application entries.

15. The computer program product of claim 12, wherein the program instructions to determine whether the set of property entries exist for the set of application entries:
   obtain a property file associated with the set of application entries; and
   determine whether property entries exist for the set of identified applications.

16. The computer program product of claim 12 wherein the program instructions to apply respective entries of the set of property entries to the set of identified applications:
   determine whether more applications exist for processing;
   identify another application to form another identified application; and
   determine whether a property entry exists for the another identified application.

17. The computer program product of claim 12 wherein the event comprises processing a startup of a specified application.

18. A method comprising the steps of:
   during a process of starting or re-starting a computer, the computer determining that a first file stored on a tangible computer readable medium of the computer identifies an application to start on the computer during the process of starting or re-starting the computer;
   the computer determining that the first file refers to an entry in a second file stored on a tangible computer readable medium of the computer;
   the computer retrieving, from the entry in the second file, a parameter for use by the computer in delaying performing a process of starting the application on the computer for a time period;
   the computer retrieving, from the entry in the second file, an indication that a log session is to be activated during the process of starting the application on the computer;
   the computer retrieving a rule associated with the application from a database stored on a tangible computer readable medium of the computer, the rule comprising a condition for starting the application on the computer and an action to perform if the condition is satisfied;
   the computer determining that the condition is satisfied; and
   after the step of the computer determining that the condition is satisfied, the computer performing the action;
   wherein the step of the computer performing the action comprises the computer performing the process of starting the application after the time period; and
   wherein the step of the computer performing the process of starting the application after the time period comprises the computer activating the log session.

19. The method of claim 18, wherein the condition is that a network dialer has been initialized on the computer, and wherein the application is a network communication-based application.

20. The method of claim 18, further comprising the step of:
   the computer retrieving, from the entry in the second file, a parameter indicating that prompting an object for input is required during the process of starting the application on the computer;
   wherein the step of the computer performing the process of starting the application after the time period comprises the computer prompting the object for the input.

* * * * *